US 6,388,973 B1

(12) United States Patent
Shimizu et al.

(10) Patent No.: US 6,388,973 B1
(45) Date of Patent: May 14, 2002

(54) CARTRIDGE TRANSPORTING APPARATUS

(75) Inventors: Takashi Shimizu; Takashi Satoh; Kaoru Takemasa, all of Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/493,286

(22) Filed: Jan. 28, 2000

(30) Foreign Application Priority Data

Jan. 29, 1999 (JP) ............................................ 11-021977

(51) Int. Cl.$^7$ ................................................ G11B 5/12
(52) U.S. Cl. ......................... 369/75.2; 360/97; 360/99; 369/178
(58) Field of Search ............................... 369/75.1, 75.2, 369/77.1, 77.2, 191; 360/99.02, 99.03, 99.06, 99.07

(56) References Cited

U.S. PATENT DOCUMENTS

| 4,774,608 A | 9/1988 | Horiuchi et al. ............... 360/97 |
| 5,146,069 A | 9/1992 | Orimoto et al. ............ 235/475 |
| 5,537,378 A | * 7/1996 | Uehara et al. ............. 369/77.2 |
| 5,862,012 A | * 1/1999 | Tsuchiya ................. 360/99.02 |

FOREIGN PATENT DOCUMENTS

| EP | 0 883 121 A2 | 12/1998 | |
| EP | 0 989 551 A1 | 3/2000 | |
| JP | 7-22006 | 8/1995 | |
| JP | 08087796 A | * 4/1996 | ........... G11B/17/04 |
| JP | 8-315481 | 11/1996 | ........... G11B/17/04 |
| JP | 09259498 A | * 10/1997 | ........... G11B/17/04 |

* cited by examiner

*Primary Examiner*—Brian E. Miller
*Assistant Examiner*—Noel Monardes
(74) *Attorney, Agent, or Firm*—Sughrue Mion, PLLC

(57) ABSTRACT

A cartridge transporting apparatus in which a disk cartridge inserted from an insertion opening is loaded into a cartridge holder in an x-direction in a three-dimensional coordinate and the cartridge holder is transported to a reproducing position in a z-direction perpendicular to the x-direction. The cartridge transporting apparatus comprises a driving roller for transporting the cartridge in its contact with a lower face of the cartridge into the cartridge holder in the x-direction, and a holder transporting mechanism for transporting the cartridge holder in the z-direction. The driving roller continues to rotate also after the holder transporting mechanism starts to transport the cartridge holder toward the reproducing position. In this configuration, the cartridge can be transported reliably.

15 Claims, 6 Drawing Sheets

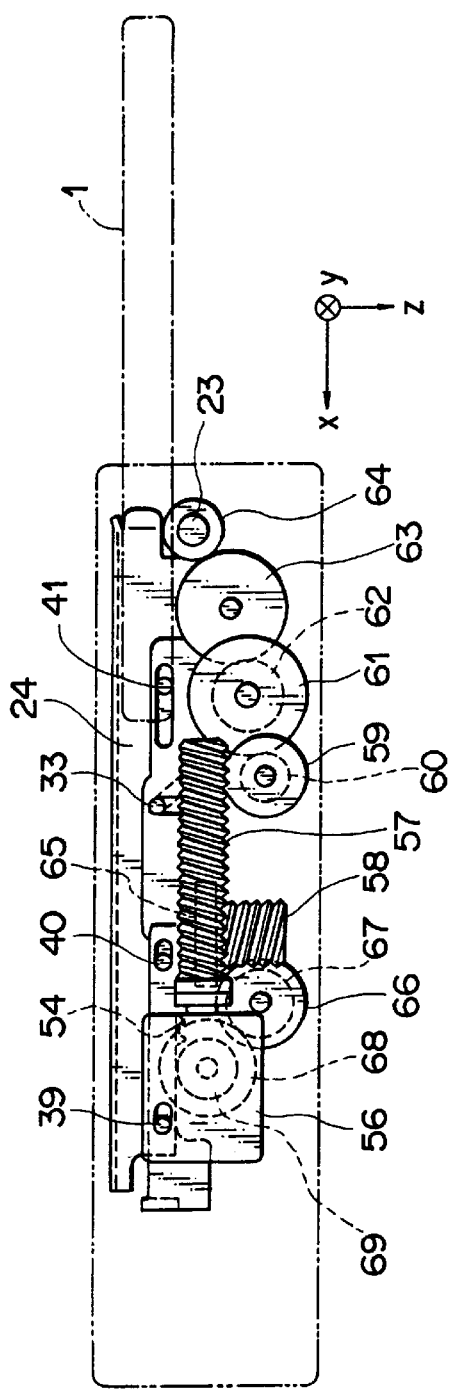
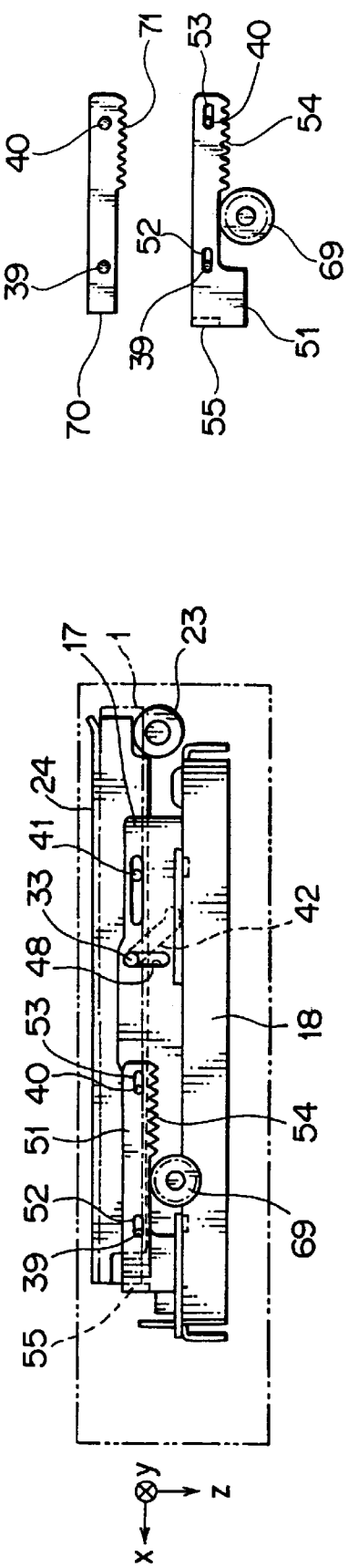

CARTRIDGE TRANSPORTING APPARATUS

BACKGROUND OF THE INVENTION

1. Field of the Invention

The present invention relates to a recording/reproducing apparatus using a cartridge such as MD (minidisk) or MO (magneto-optic disk), particularly to a cartridge transporting apparatus for transporting a cartridge between a prescribed input/output position and a recording/reproducing position.

2. Description of the Related Art

Previously known is a cartridge having a structure in which a recording/reproducing medium such as a MD, MO, etc. is housed in a cartridge case. A conventional recording/reproducing apparatus using such a cartridge is disclosed in JP-A-8-315481.

In the conventional recording/reproducing apparatus, when a cartridge is inserted into an inlet provided at an input/output position by a user, a cartridge transporting mechanism automatically starts a loading operation so that the cartridge being held in a cartridge holder is horizontally transported to a prescribed position in a recording/reproducing apparatus. Thereafter, the cartridge and cartridge holder which are integrally held descend into a prescribed recording/reproducing position so that the cartridge is clamped at a prescribed recording/reproducing position.

In the cartridge transporting mechanism attached to the conventional recording/reproducing apparatus, the cartridge is horizontally transported to the above prescribed position by rotating a roller by a driving motor while it is in contact with the side wall or edge of the cartridge inserted from the insertion opening.

In this case, since a contact area between the roller and the side wall of the cartridge is small, the contact face of the roller wears and becomes liable to slip. The secular change due to the wear might reduce the reliability of the transportation of the cartridge.

This makes it impossible to position the cartridge at a prescribed recording/reproducing position so that the cartridge may be clamped in a slanted state. Thus, the clamping region which is centrally formed on the recording/reproducing medium is held displaced at a turn table located at the recording/reproducing position. Therefore, the recording/reproducing face of the recording/reproducing medium is brought into contact with the inner wall of the cartridge so that the recorded information may be damaged during recording/reproducing.

The present invention has been accomplished in order to obviate such an inconvenience.

An object of the present invention is to provide a cartridge transporting apparatus which can transport a cartridge to a prescribed recording/reproducing position surely and accurately.

In order to attain the above object, in accordance with an aspect of the present invention, there is provided a cartridge transporting apparatus in which a disk cartridge inserted from an insertion opening is loaded into a cartridge holder in an x-direction in a three-dimensional coordinate and the cartridge holder is transported to a reproducing position in a z-direction perpendicular to the x-direction, comprising: a driving roller for transporting the cartridge in its contact with a lower face of the cartridge into the cartridge holder in the x-direction, and a holder transporting mechanism for transporting the cartridge holder in the z-direction, wherein the driving roller continues to rotate also after the holder transporting mechanism starts to transport the cartridge holder toward the reproducing position.

In accordance with another aspect of the present invention, there is provided a cartridge transporting apparatus for transporting a cartridge with an information recording medium housed therein to a recording/reproducing position, comprising: a cartridge holder in which the cartridge is loaded from an insertion opening in a x-direction in a three-dimensional coordinate; a driving roller for transporting the cartridge into the cartridge holder in contact with a lower surface of the cartridge; and a cartridge holder transporting mechanism for transporting the cartridge holder in a z-direction perpendicular to the x-direction; wherein the holder transporting mechanism has a rack member including a contact portion on the back side of the cartridge holder in the x-direction, the contact portion being movable in the x-direction in contact with the front end of the cartridge, and transports the cartridge holder downward in the z-direction when the contact portion is moved by a prescribed distance.

In accordance with the present invention, when a cartridge is carried into the side of the driving roller by a user, the driving roller rotates in contact with the cartridge to carry the cartridge into a cartridge holder. Further, since a holder transporting mechanism transports the cartridge holder in a direction perpendicular to the direction of inserting the cartridge, the cartridge can be loaded to a recording/reproducing position reliably and accurately.

The above and other objects and features of the present invention will be more apparent from the following description taken in conjunction with the accompanying drawings.

BRIEF DESCRIPTION OF THE DRAWINGS

FIG. 4 is a side view showing the structure of a holder transporting mechanism;

FIG. 5A–5B are views for explaining the operation of a cartridge transporting apparatus;

DESCRIPTION OF THE PREFERRED EMBODIMENTS

Now referring to FIGS. 1–8, an explanation will be given of various embodiments of a cartridge transporting apparatus which is applied to a recording/reproducing apparatus using an MD cartridge. In these figures, the explanation will be made assuming that the direction of carrying in the MD cartridge is an x direction, that of clamping the MD cartridge is a z direction and that orthogonal to the x direction and z direction is a y direction.

Figure 8A:
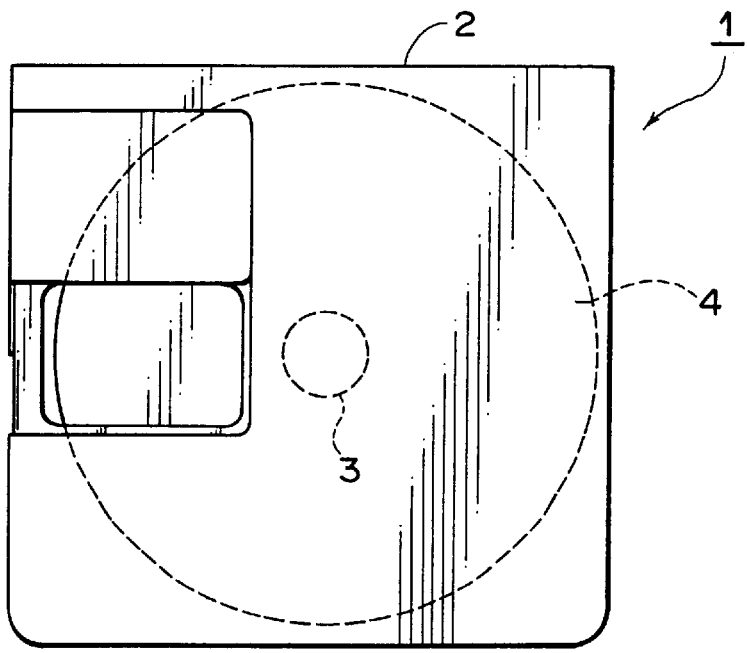
FIGS. 8A–8B are a plan view and a back view of the schematic structure of an MD cartridge.
Figure 8B:
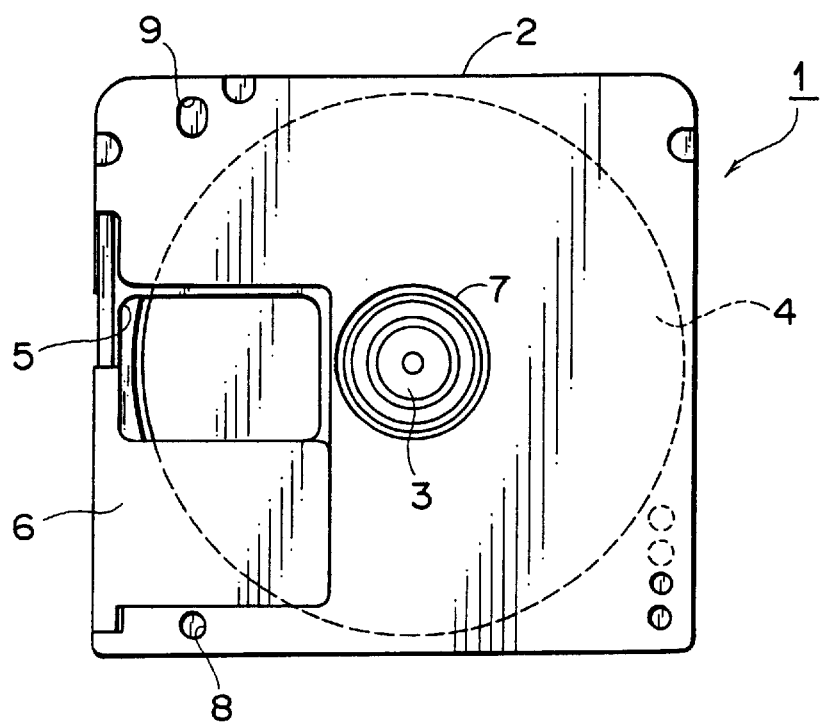

First, referring to FIGS. 8A–8B, an explanation will be given of the structure of an MD cartridge 1. FIG. 8A is a plan view of the MD cartridge when viewed from the surface side. FIG. 8B is another plan view of the MD cartridge when viewed from the back side. In FIG. 8, the MD cartridge has a structure based on a prescribed standard in which a disk-shaped recording/reproducing medium 4 supported by a circular clamping region 3 is housed in a cartridge case 2 with resin-molded square shells superposed on each other. The cartridge case 2 includes, on its back side, a square opening 5 for exposing the one side of the recording/reproducing medium 4 during recording/reproducing, a sliding shutter 6 for protecting the recording/reproducing medium 4 by covering the opening 5 during the other period than the recording/reproducing, a circular supporting hole 7 for rotatably supporting the clamping region 3 and positioning holes 8 and 9 for positioning the MD cartridge 1 at a prescribed recording/reproducing position in a recording/reproducing apparatus.

Figure 1:
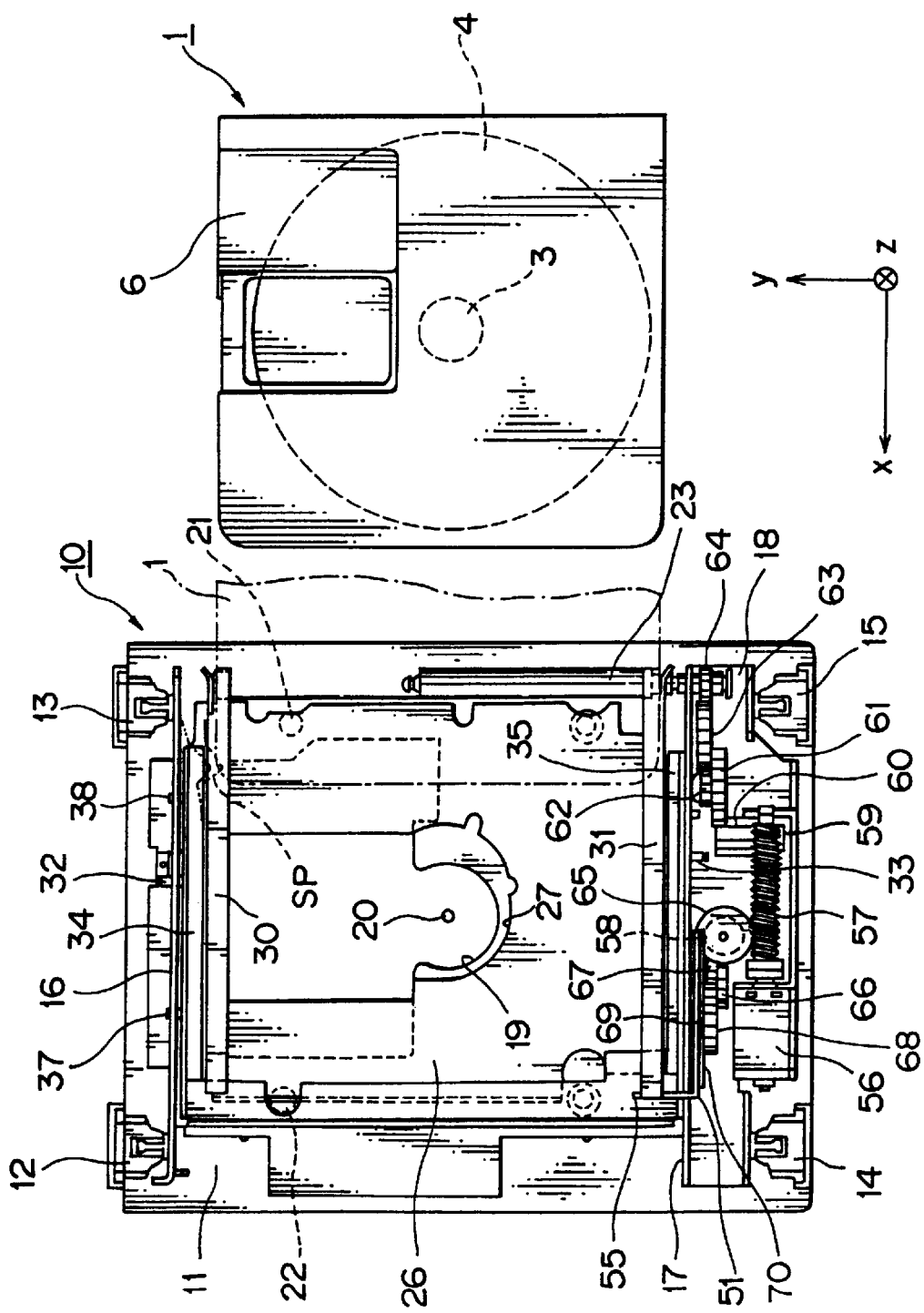
FIG. 1 is a plan view of the structure of a cartridge transporting apparatus according to the present invention.

FIG. 1 is a plan view of the cartridge transporting mechanism 10 which is applied to a recording/reproducing apparatus using an MD cartridge 1. In FIG. 1, fixing members 12–15 having oscillation-proofing structure for fixing the cartridge transporting apparatus are attached at four positions of the bottom of a square hard frame 11. A first side plate 16, which is perpendicular to the bottom face of the hard frame 11, is attached to the fixing members 12 and 13, whereas a supporting member 18 for supporting a second side plate 17, which is perpendicular to the bottom face of the hard frame 11, is attached to the fixing members 14 and 15. In this way, the first and the second side plate 16 and 17 are arranged in parallel in the x-direction. On the bottom face of the hard frame 11, a through-hole 19 is made to expose a magnetic head (not shown) for recording/reproducing, and a turn table (not shown) upward in a z-direction. The turn table serves to mount the clamping region 3 of the MD cartridge 1 for recording/reproducing and to rotate it. The rotary center position of the turn table is indicated by reference numeral 20.

Projections 21 and 22 are uprighted apart by a prescribed interval therebetween upward from the bottom of the hard frame 11 so that they are adapted to be engaged with the holes for positioning the MD cartridge.

At the side edge of the hard frame 11, a driving roller 23 is provided which is perpendicular to the first and the second side plate 16 and 17. The driving roller 23 is formed in a shape of a circular cylinder with a metallic rotary shaft which is covered with hard rubber having a friction resistance on its circumferencial face. The driving roller 23 is rotatably supported at both ends of the rotary shaft. The driving roller 23 is arranged on the second side plate 17. The driving roller is designed at a length which is brought into contact with the slide shutter 6 when the MD cartridge 1 is transported.

Figure 2A:
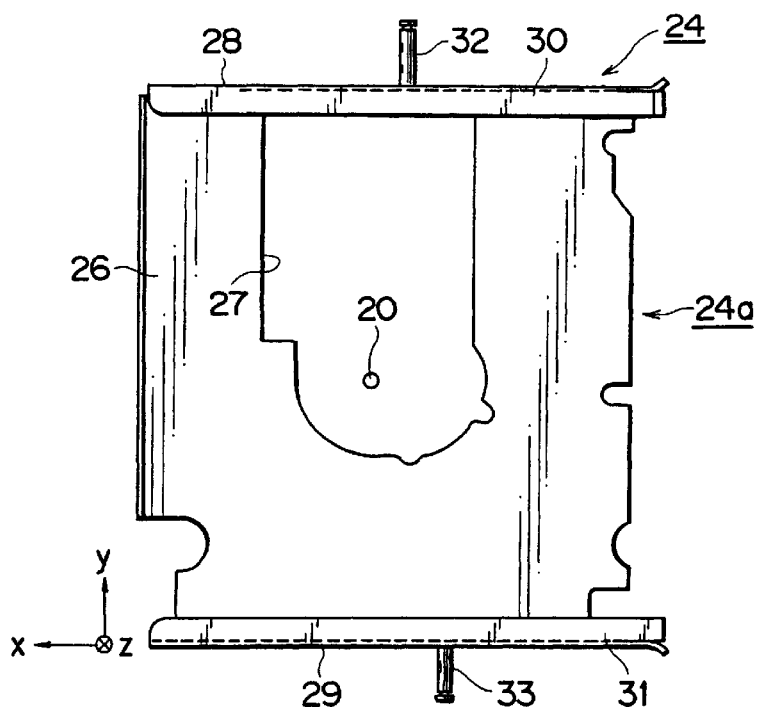
FIGS. 2A–2C are plan views showing the structure of each of a cartridge holder and steering member.
Figure 2B:
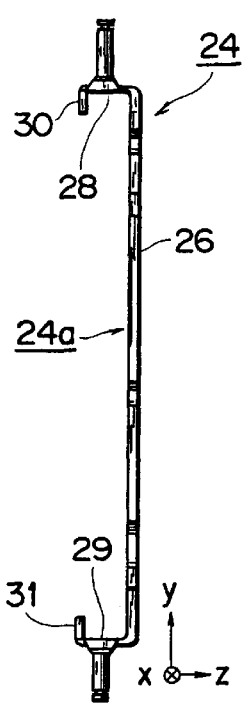
Figure 2C:
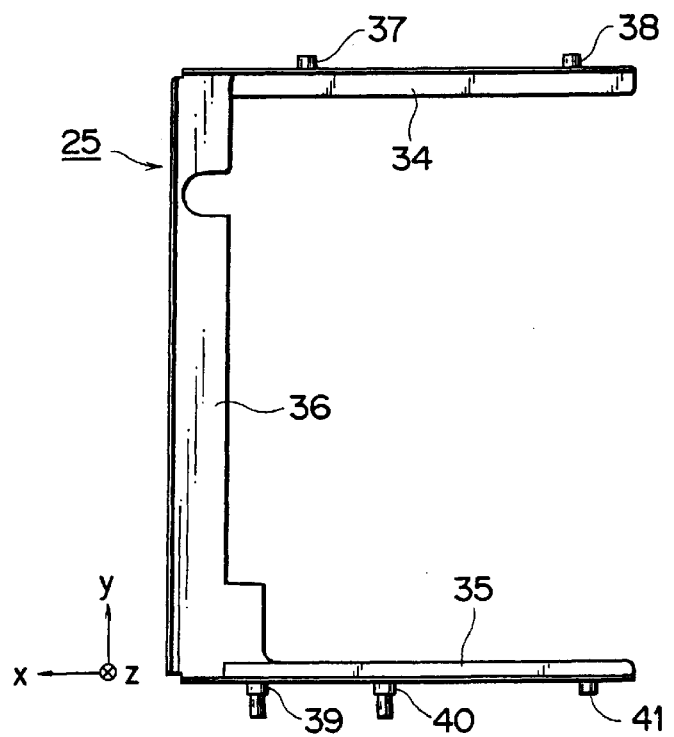

As seen from the plan view of FIG. 2A, above the hard frame 11 between the first and the second side plate 16 and 17, a square cartridge holder 24 is arranged. As seen from the plan view of FIG. 2C, a steering member 25 is arranged between the outer wall of the cartridge 24 and the inner walls of the first and the second side plate 16 and 17. On a bottom wall of the cartridge holder 24, a through-hole 27 is made to expose the turn table in such a manner that it overlaps the through-hole 27 for exposing the turn table. On both sides of the bottom wall 26 in the y-direction, as seen from the side view of FIG. 2B, the cartridge holder 24 has side walls 28 and 29 each having a prescribed height and visors 30 and 31 attached to upper ends of the side walls 28 and 29 inwardly. The side walls 28, 29 and visors 30, 31 are integrally molded to the bottom wall 26 by the technique such as bending. The cartridge holder 24 has engagement projections 32 and 33 oriented outwardly in the y-direction at the prescribed positions of the side walls 28 and 29. A spring plate SP is attached to the side wall 28 so that it is elastically engaged with the shutter 6 of the MD cartridge 1. Thus, the shutter 6 can be opened in accordance with the carry-in operation of the MD cartridge 1.

The MD cartridge 1 is adapted to be inserted horizontally from an inlet/outlet position on the side of the driving roller 23 into a square gap 24a defined by the bottom wall 26, side walls 28, 29 and visors 30, 31. In this case, the MD cartridge 1 is adapted to be inserted in such a fashion that its bottom face (rear face) is oriented toward the driving roller 23. As seen from FIG. 2C, the steering member 25 includes a first arm 34 which intervenes between the first side plate 16 and the side wall 28 of the cartridge holder 24, a second arm 35 which intervenes between the second side plate 17 and the side wall of the cartridge holder 24, and a coupling member 36 coupling these first and second arms 34 and 35 with each other. The first and the second arm 34 and 35 have a plurality of engagement projections 37, 38, 39, 40 and 41 which protrude outwardly in the y-direction at the prescribed positions of the arms 34 and 35.

Figure 3A:
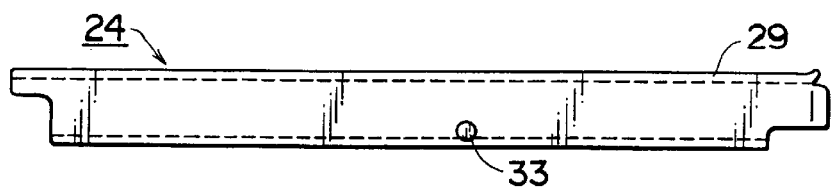
FIGS. 3A–3F are side views showing the respective structures of the cartridge holder, steering member, side plate and rack member.
Figure 3B:
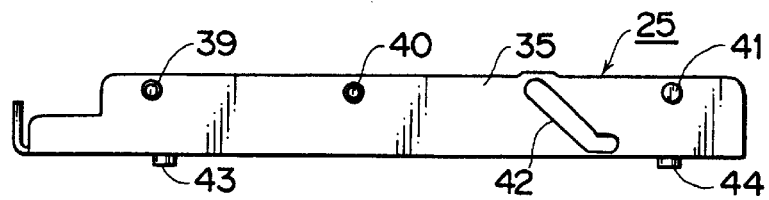

As seen from the side view of FIG. 3B, the second arm 35 of the steering member 25 has a pair of guiding projections 43 and 44 which protrude from the bottom thereof. The second arm 35 has a slanted guiding hole 42 slanted on the skew for the x-direction and y-direction.

Figure 3C:
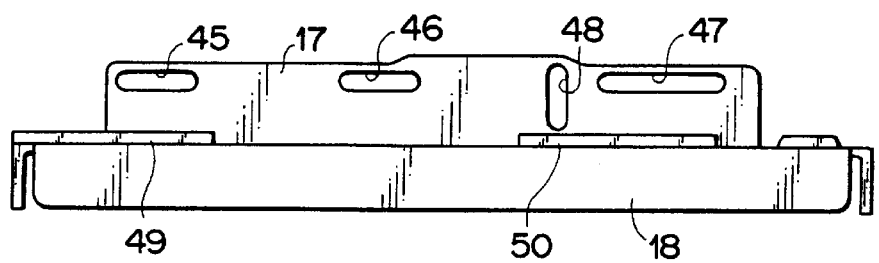
Figure 3D:
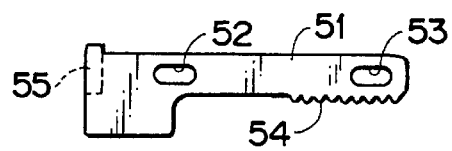
Figure 3E:
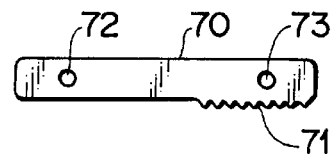

As seen from the side view of FIG. 3C, the second side plate 17 has lengthy engagement holes 45, 46 and 47 in the x-direction and a guide hole 48 in the z-direction. The supporting member 18 has guide members 49 and 50 for guiding the steering member 25 back and forth in the x-direction while they are engaged with the guiding protrusions 43 and 44. The engagement projections 39, 40 and 41 of the second arm 35 are fit in the engagement holes 45, 46 and 47. As seen from the side view of FIG. 3A, the engagement projection 33 of the cartridge holder 24 is fit in the hole formed when the slanted guide hole 42 of the second arm 35 and the guide hole 48 of the second side plate 17 overlap. Thus, the cartridge holder 24 and the second arm 35 of the steering member 25 are combined with the second side plate 17.

The guide hole 48 has a length in the z-direction which is equal to the clamping distance along which the cartridge holder 24 is moved to the recording/reproducing position during loading described later. The slanted guide hole 42 is designed so that the engagement projection 33 is movable in the guide hole 48.

Therefore, as described later, when the steering member 25 moves in the x-direction, the engagement projection 33 of the cartridge holder 24 slides into the slanted guide hole 42 and moves vertically. Further, since the engagement protrusion 33 is engaged with the guide hole 48 of the second side plate 17, the cartridge holder 24 moves vertically between the loading position and the recording/reproducing position. Engagement holes 45, 46 and 47 are made for supporting engagement protrusions 39, 40, 41, respectively. Therefore, the engagement holes 45, 46 and 47 are designed to have a length permitting the steering member 25 to be movable within a range in the x-direction of the slanted guide hole 42.

Although not shown, the first arm 34 of the steering member 25 also has a slanted guide hole similar to the slanted guide hole of the second arm 35. The first side plate 16 also has engagement holes and a guide hole similar to the engagement holes 45–47 and guide hole 48 of the second side plate 17. The cartridge holder 24 and first arm 34 of the steering member 25 are combined with the first side plate 16 in such a manner that the engagement projections 32, 37 and 38 are fit in the slanted guide hole, engagement hole and guide hole on the side of the first side plate 16 and first arm 34. Therefore, when the steering member 25 moves in the x-direction, the cartridge holder 24 can move with no slant nor rattle.

A rack member 51 is arranged on the outside of the second side plate 17. The rack member 51 has elliptical eccentric holes 52, 53, gear 54 and a contact portion 55 which extends to the inside of the cartridge holder 24. The engagement projections 39 and 40 are adapted to fit in the eccentric holes 52 and 53.

The eccentric holes 52 and 53 of the rack member 51 are designed to have a length in the x-direction so that the moving distance in the x-direction of the rack member 51 in the state where the engagement projections 39, 40 have been fit in the engagement holes is approximately equal to the radius of the driving roller 23 for transporting the cartridge 1. A gear plate 70 is arranged on the outside of the rack member 51. The gear plate 70 has a gear portion 71 and engagement holes 72, 73. The engagement projections 39 and 40 are adapted to fit in the engagement holes 72 and 73 so that the gear plate 70 is secured to the tip of the engagement protrusions 39 and 40.

FIG. 3 is a side view of the state where the cartridge holder 24, steering member 25, second side plate 17, rack member 51 and a gear plate 70 have been assembled. The gear portion 54 of the rack member 51 is designed to have a length of the radius of the driving roller 23 plus the length of the slanted guide hole 42 in the x-direction, over which the rack member 51 can move. The gear portion 71 of the gear plate 70 is designed to have a length of the slanted guide hole 42 over which the steering member 25 can move.

In a standby state where the cartridge 1 is to be loaded, the engagement projection 33 of the cartridge holder 24 resides at the top of the slanted guide hole 42 in the z-direction and the cartridge holder 24 resides to be able to house the cartridge 1 which is transported by the rotation of the driving roller 23.

In such a standby state, the rack member 51 is in a state where the engagement protrusions 39 and 40 of the steering member 25 are in contact with the leftmost positions of the the eccentric holes 52 and 53, respectively.

In this state, the gear 69 is not still engaged with the gear portion 54 of the rack member 51. When the rack member 51 moves slightly, the gear 69 will be engaged with the gear 54. The contact portion 55 of the rack member 51 resides at the position slightly shorter than the length of the cartridge from the center of the driving roller 23.

The gear plate 70 has a gear portion 71 extending from the position where it is engaged with the gear 69 after the rack 51 moves in the x-direction to bring the engagement protrusions 39, 40 into contact with the rightmost ends of the eccentric holes 52, 53

Now referring to FIGS. 1 and 4, an explanation will be given of the holder transporting mechanism for loading and unloading the cartridge 1. FIG. 4 is a side view of the holder transporting mechanism seen from the side of the second side plate.

The holder transporting mechanism is supported by a supporting member 18 and is provided with a driving motor 56 and plural worm gears 57, 58 and gears 59–69. Specifically, the gear 59 is engaged with the worm gear 57 coupled with the driving shaft of the driving motor 56. The gear 61 is engaged with the small-diameter gear 60 inte-grated with the gear 59. The gear 63 is engaged with the small-diameter gear 62 integrated with the gear 61. Further, the gear 64 fixed to the rotary shaft of the driving roller 23 is engaged with the gear 63.

Figure 3F:
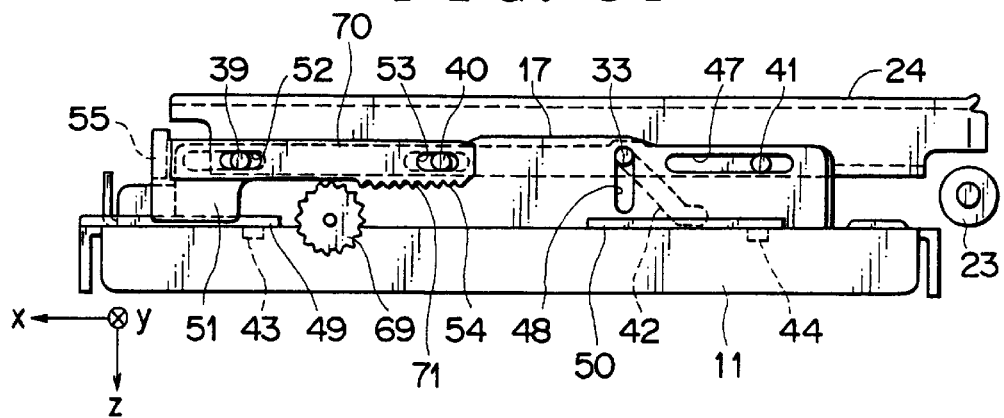

The gear 65 is engaged with the worm gear 57. The gear 66 is engaged with the worm gear 58 integrated with the gear 65. The gear 68 is engaged with the small-diameter gear 67 integrated with the gear 66. Further, the small-diameter gear 69 integrated with the gear 68, as seen from FIG. 3F, is located at a position where it is not engaged with the gear 54 of the rack member 51 when the rack 51 moves rightmost under control by the eccentric holes 52 and 53.

In the holder transporting mechanism having such a structure, when the worm gear 57 is normally rotated by the driving force of the driving motor 56, the gears 59–64 operate in an interlock therewith so that the drive roller 23 is rotated normally. At the same time, the worm gear 58 and gears 66–69 operate via the gear 65 engaged with the worm gear 57 so the gear 69 is rotated normally. On the other hand, when the worm gear 57 is rotated inversely by the driving force of the driving motor 56, the drive roller 23 and gear 69 are rotated inversely.

Figure 6B:
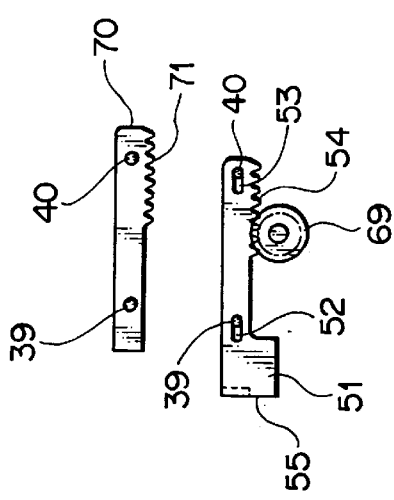
FIGS. 6A–6B are views for explaining the operation of the cartridge transporting apparatus.
Figure 7B:
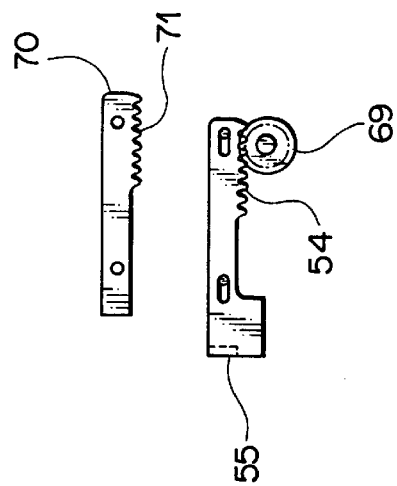
FIGS. 7A–7B are views for explaining the operation of the cartridge transporting apparatus.
Figure 6A:
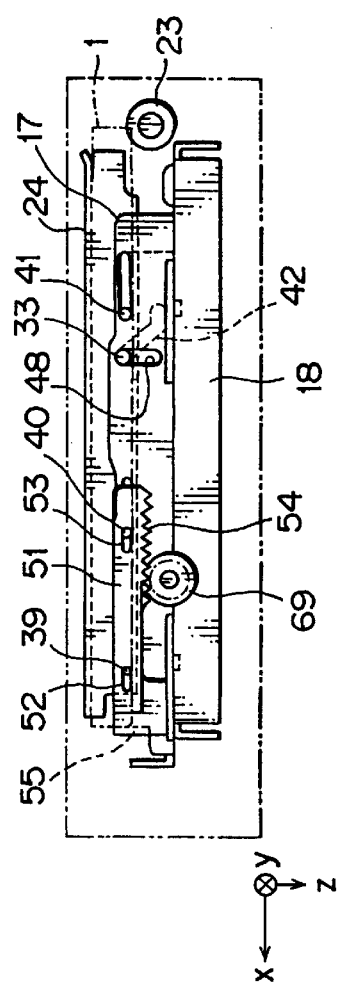
Figure 7A:
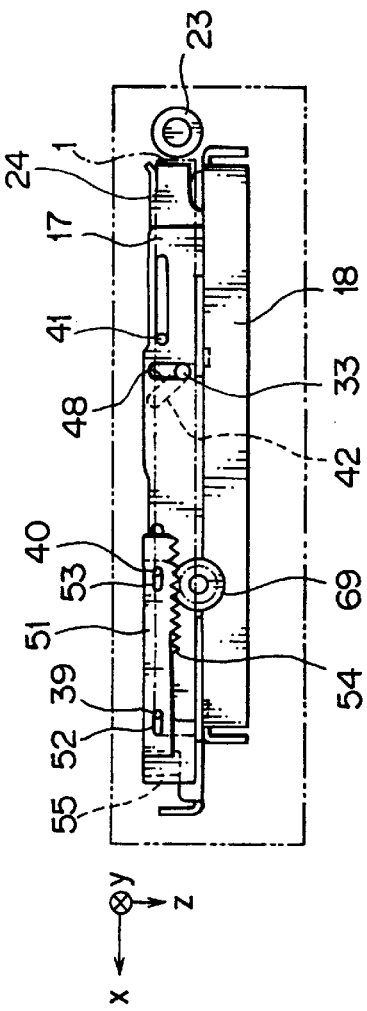

Referring to FIGS. 5–7, an explanation will be given of the loading operation of the cartridge transporting mechanism 10 according to this embodiment. In these figures, FIGS. 5A, 6A and 7A are side views of the cartridge transporting apparatus when seen from the side of the rack 51 in which the holder transporting mechanism except the gear 69 is not shown. The operation will be explained typically of the cartridge holder 24, steering member 25 and rack member 51 for the second side plate 17. The operation will be not explained about the cartridge holder 24, steering member 25 and rack member 25 and rack member for the first side plate 16. FIGS. 5B, 6B and 7B show a relationship among the gear plate 70, rack member 51 and gear 69.

In the standby state before the cartridge 1 is inserted, as shown in FIGS. 5A and 5B, the rack member 51 moves rightward according to the displacement between the engagement protrusions 39, 40 and the elliptical eccentric holes 52, 53. In addition, the engagement protrusions 33, 39, 40 and 41 as shown in FIGS. 3A–3C are limited by the engagement holes 45, 46 and 47, slanted guide hole 42 and guide hole 48. Thus, the cartridge holder 24 and steering member 25 are at rest at a rightmost position for the first side plate 17. The gear 54 of the rack member 51 is not engaged with the gear 69. In this state, it is assumed that the cartridge 1 is inserted horizontally in the cartridge holder 24 from the input/output position on the side of the driving roller 23 and further slightly squeezed therein against spring force of a spring. Then, a sensor (not shown) detects the insertion of the cartridge so that the driving roller 23 starts to rotate counterclockwise. The driving roller 23 automatically carries the cartridge 1 toward the back of the cartridge holder 24 in contact with the bottom face (back face) of the cartridge 1.

When the cartridge 1 has been carried in by the driving roller 23, as seen from FIGS. 6A and 6B, the tip of the cartridge 1 is brought into contact with the contact portion 55 so that the rack member 51 is moved leftward in the figure. Thus, the gear portion 54 of the rack member 51 is engaged with the gear 69 so that the rack member 51 moves leftwards by a maximum distance over which the engagement projections 39, 40 can move within the eccentric holes 52, 53, respectively.

In this state, the cartridge 1 has been completely loaded in the cartridge holder 24. Therefore, the rear end of the cartridge 1 in the inserting (horizontal) direction is in contact with the driving roller 23 so that it is aligned with the rotating shaft (central axis) of the driving roller 23. When the rack member 51 is further moved by the gear 69, as shown in FIGS. 7A and 7B, the steering member 25 is also pulled leftward as the engagement projections 39, 40 fit in the eccentric holes 52, 53 are moved. Thus, the gear 69 is engaged with the gear 71 of the gear plate 70 so that the steering member 25 is moved leftward by the rotation of the gear 69. When the steering member 25 is successively pulled leftward by the gear 69, the engagement projection 33 is moved in the direction defined by the slanted hole 42 and guide hole 48, i.e. z-direction. Thus, the cartridge holder 24 is forcibly descended toward the bottom wall of the hard plate 11. In this case, the rear end of the cartridge 1 in the insertion direction remains in contact with the driving roller 23. However, this does not hinder the descend of the cartridge in the z-direction since the driving roller 23 is rotating counterclockwise. Thus, the rear end of the cartridge 1 in the insertion direction descends being in contact with the driving roller 23.

Since the driving roller 23 continues to rotate while the cartridge 24 descends in the z-direction, it is not necessary to provide any particular means for separating the cartridge 1 and driving roller 23 from each other.

The cartridge holder 24 descends so that the clamping region 3 of the cartridge 1 is loaded on the turn table so as to be aligned with the rotary center position 20. The cartridge 1 is loaded surely and accurately in a prescribed recording/reproducing position since the positioning protrusions 21 and 22 uprighted from the hard frame 11 are fit in the positioning holes 8 and 9.

When the loading of the cartridge 1 is detected by a micro-switch (not shown) or the like, the power supply to the driving motor 56 is stopped. Thus, information can be recorded in or reproduced from the recording/reproducing medium 4.

Referring to FIGS. 5–7, an explanation will be given of the unloading operation of the cartridge transporting mechanism 10.

When a user operates a switch (not shown) for unloading with the cartridge 1 loaded in the recording/reproducing position as shown in FIGS. 7A and 7B, power supply is started for rotating the driving motor 56 inversely. Thus, the gear 69 and the driving roller 23 are rotated inversely. When the gear 69 rotates inversely, the rack member 51 and steering member 25 are moved rightward. Thus, the engagement projection 33 is moved upward in the z-direction under the control by the slanted guide hole 42 and guide hole 48. Simultaneously, the cartridge holder 24 is lifted so that the gear 69 is dis-engaged from the gear 71 of the gear plate, which results in the state shown in FIGS. 7A and 7B. The gear 69 further rotates so that the rack member 51 moves rightwards. Then, the cartridge 1 in the cartridge holder 24 is extruded by the contact portion 55 of the rack member 51. As a result, as shown in FIG. 6A, the rear end of the cartridge 1 in the insertion direction is brought into contact with the driving roller 23 as shown in FIG. 6A. Thus, the transportation of the cartridge 1 is started in the x-direction.

As shown in FIG. 5B, the gear 69 leaves from the gear portion 54 of the rack member 51. When the cartridge 1 has been carried out from the inlet, the driving of the driving motor 56 is stopped.

In accordance with this embodiment, since there is provided the driving roller 23 in contact with the rear of the cartridge 1, the contact area between the cartridge 1 and driving roller 23 is increased, thereby improving the reliability of transportation. Further, the increase in the contact area between the cartridge 1 and driving roller 23 greatly reduces the aberration of the contact face of the driving roller 23. Since the cartridge 1 can be transported by the driving roller 23 not being in contact with the sliding shutter 6, an accident that the sliding shutter 6 is inadvertently opened during transportation to injure the recording/reproducing medium 4 can be prevented.

Thus, the cartridge can be transported to a prescribed recording/reproducing position surely and accurately.

What is claimed is:

1. A cartridge transporting apparatus in which a disk cartridge inserted from an insertion opening is loaded into a cartridge holder in an x-direction and the cartridge holder is transported to a reproducing position in a z-direction perpendicular to the x-direction, comprising:

a driving roller in contact with a lower surface of said cartridge for transporting said cartridge in the x-direction, into said cartridge holder, and a holder transporting mechanism for transporting said cartridge holder in the z-direction, wherein said driving roller continues to rotate after said holder transporting mechanism starts to transport the cartridge holder toward the reproducing position.

2. A cartridge transporting apparatus according to claim 1, wherein said driving roller is arranged to extend in a y-direction perpendicular to both x- and z-direction in the vicinity of the insertion opening; and said holder transporting mechanism starts to drive said cartridge holder downward towards the reproducing position when a rear end of the cartridge reaches a central axial line of said driving roller in the x-direction.

3. A cartridge transporting apparatus according to claim 1, wherein said driving roller rotates while it is kept in contact with a rear end of the cartridge moving in the z-direction.

4. A cartridge transporting apparatus in which a disk cartridge inserted from an insertion opening in an x-direction in a three-dimensional coordinate is loaded into a cartridge holder and the cartridge holder is transported to a reproducing position in a z-direction perpendicular to the x-direction, comprising:

a driving roller in contact with a lower surface of the cartridge for transporting said cartridge into said cartridge holder;

a holder transporting mechanism for transporting said cartridge holder in the z-direction between a loading position where the cartridge is loaded and said reproducing position; and a cartridge moving mechanism for moving said cartridge in the x-direction so as to be brought into contact with the said driving roller when the said cartridge holder has been transported from said reproducing position to said loading position.

5. A cartridge transporting apparatus according to claim 4, wherein said driving roller continues to rotate also after said holder transporting mechanism starts to transport the cartridge holder toward the reproducing position.

6. A cartridge transporting apparatus for transporting a cartridge with an information recording medium housed therein to a recording/reproducing position, comprising:

a cartridge holder in which said cartridge is loaded from an insertion opening in an x-direction;

a driving roller in contact with a lower surface of the cartridge for transporting said cartridge into said cartridge holder; and a cartridge holder transporting mechanism for transporting said cartridge holder in a z-direction perpendicular to the x-direction;

wherein said holder transporting mechanism has a rack member, and said rack member has a contact portion which is located behind said driving roller, said contact portion being movable in the x-direction in contact with a front end of said cartridge, and transports said cartridge holder downward in the z-direction when said contact portion is moved by a prescribed distance.

7. A cartridge transporting apparatus according to claim 6, wherein said cartridge holder transporting mechanism comprises:

a steering member having a slanting hole which is slanted from both x- and z-directions;

a securing member having a guide hole formed to extend in the z-direction; and a first projection which is formed in said cartridge holder and is to be fit in said slanted hole and said guide hole, wherein said steering member is moved in the z-direction.

8. A cartridge transporting apparatus according to claim 7, further comprising:

a gear plate with a first gear portion, which is secured to said steering member; and a gear to be engaged with the first gear portion of said gear plate, wherein said gear is rotated to move said steering member in the x-direction.

9. A cartridge transporting apparatus according to claim 8, wherein said rack member has an eccentric hole extended in the x-direction and said steering member has a second projection to be fit in said eccentric hole and to be movable therein by a distance approximately equal to a radius of said driving roller, whereby when said rack member is moved in the x-direction in engagement between a second gear portion of said rack member and said gear, said second projection is brought into contact with a rear end of said eccentric hole to move said steering member in the x-direction, and said steering member is moved in the x-direction so that said second gear portion is engaged with said gear, thereby moving said steering member in the x-direction.

10. A cartridge transporting apparatus according to claim 8, wherein when said gear plate is moved in the x-direction by a distance approximately equal to a radius of said driving roller, said gear is engaged with said gear portion of said gear plate so that said steering member is moved in the x-direction.

11. A cartridge transporting apparatus according to claim 10, wherein said driving roller continues to rotate even after said steering member starts to move in the x-direction so that said cartridge is carried in said cartridge holder.

12. A cartridge transporting apparatus according to claim 10, wherein when said cartridge holder resides at said recording/reproducing position, said gear is engaged with both said first gear portion of said gear plate and a second gear portion of said rack member.

13. A cartridge transporting apparatus according to claim 6, wherein said contact portion is made movable by a distance approximately equal to a radius of said driving roller.

14. A cartridge transporting apparatus according to claim 6, wherein in a stand-by state, said contact portion resides at a position slightly shorter than a length of the cartridge from a center line of the driving roller.

15. A cartridge transporting apparatus according to claim 6, wherein said rack member includes a second gear portion whereby when said rack member moves in contact between said contact portion and said cartridge, said second gear portion is engaged with said gear so that the rack member is moved by rotation of said gear.

* * * * *